US008902913B2

(12) United States Patent
Poghosyan

(10) Patent No.: US 8,902,913 B2
(45) Date of Patent: Dec. 2, 2014

(54) RELAY WITH EFFICIENT SERVICE CHANGE HANDLING

(75) Inventor: Areg Poghosyan, Kitchener (CA)

(73) Assignee: Blackberry Limited, Waterloo, Ontario (CA)

(*) Notice: Subject to any disclaimer, the term of this patent is extended or adjusted under 35 U.S.C. 154(b) by 144 days.

(21) Appl. No.: 13/592,776

(22) Filed: Aug. 23, 2012

(65) Prior Publication Data

US 2014/0056311 A1    Feb. 27, 2014

(51) Int. Cl.
*H04L 12/28*    (2006.01)

(52) U.S. Cl.
USPC .......................................................... 370/412

(58) Field of Classification Search
CPC ...................................................... H04L 12/56
USPC .......................................................... 370/412
See application file for complete search history.

(56) References Cited

U.S. PATENT DOCUMENTS

| 6,173,312 | B1 | 1/2001 | Atarashi et al. | |
| 6,654,361 | B1 | 11/2003 | Dommety et al. | |
| 8,548,454 | B2* | 10/2013 | Schrader et al. | 455/421 |
| 2005/0232188 | A1 | 10/2005 | Sakamoto et al. | |
| 2008/0037553 | A1* | 2/2008 | Gilmartin et al. | 370/395.41 |
| 2012/0196632 | A1 | 8/2012 | Smith et al. | |
| 2012/0252444 | A1 | 10/2012 | Pan | |
| 2013/0064075 | A1* | 3/2013 | Pu | 370/225 |
| 2013/0095786 | A1 | 4/2013 | Bradburn | |
| 2014/0029546 | A1* | 1/2014 | Schrader et al. | 370/329 |
| 2014/0043968 | A1* | 2/2014 | Simen et al. | 370/230 |

FOREIGN PATENT DOCUMENTS

| EP | 2485443 A1 | 8/2012 |
| EP | 2560325 A1 * | 2/2013 |

OTHER PUBLICATIONS

Corresponding European Patent Application No. 12181605.2 European Search Report dated Jan. 30, 2013.
Akyol B A etal: "Rerouting for Handoff in a Wireless ATM Network", IEEE Personal Communications, IEEE Communications Society, US, vol. 3, No. 5, Oct. 1, 1996, pp. 26-33, XP000617177, ISSN: 1070-9916, DoI: 10.1109/98.542235.
Related European Patent Application No. 12181608.6 Search Report dated Oct. 14, 2012.

* cited by examiner

*Primary Examiner* — Hassan Kizou
*Assistant Examiner* — Abdullahi Ahmed
(74) *Attorney, Agent, or Firm* — Perry + Currier, Inc.

(57) ABSTRACT

A relay device with efficient service change handling, and method there for, is provided. The relay comprises: a processor; a memory; a communication interface; and a plurality of connection objects, each of the plurality of connection objects comprising a respective queue of messages, each of the messages for relay in association with respective devices via the communication interface, the processor enabled to maintain, in the memory, a cache of associations between respective identifiers of the connection objects and identifiers associated with respective messages respectively queued therein; receive an indication of a service change to a given device; determine, from the cache, a subset of the plurality of connection objects comprising given messages associated with the given device; and, communicate only with the subset to apply an action associated with the service change to the given messages, while ignoring the remaining connection objects.

18 Claims, 7 Drawing Sheets

US 8,902,913 B2

RELAY WITH EFFICIENT SERVICE CHANGE HANDLING

FIELD

The specification relates generally to relays, and specifically to a relay device with effluent service change handling.

BACKGROUND

When service changes occur in a communication network, relays (including routers and the like) in the communication network apply the service changes when communicating with all other relays with which they are communicating.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
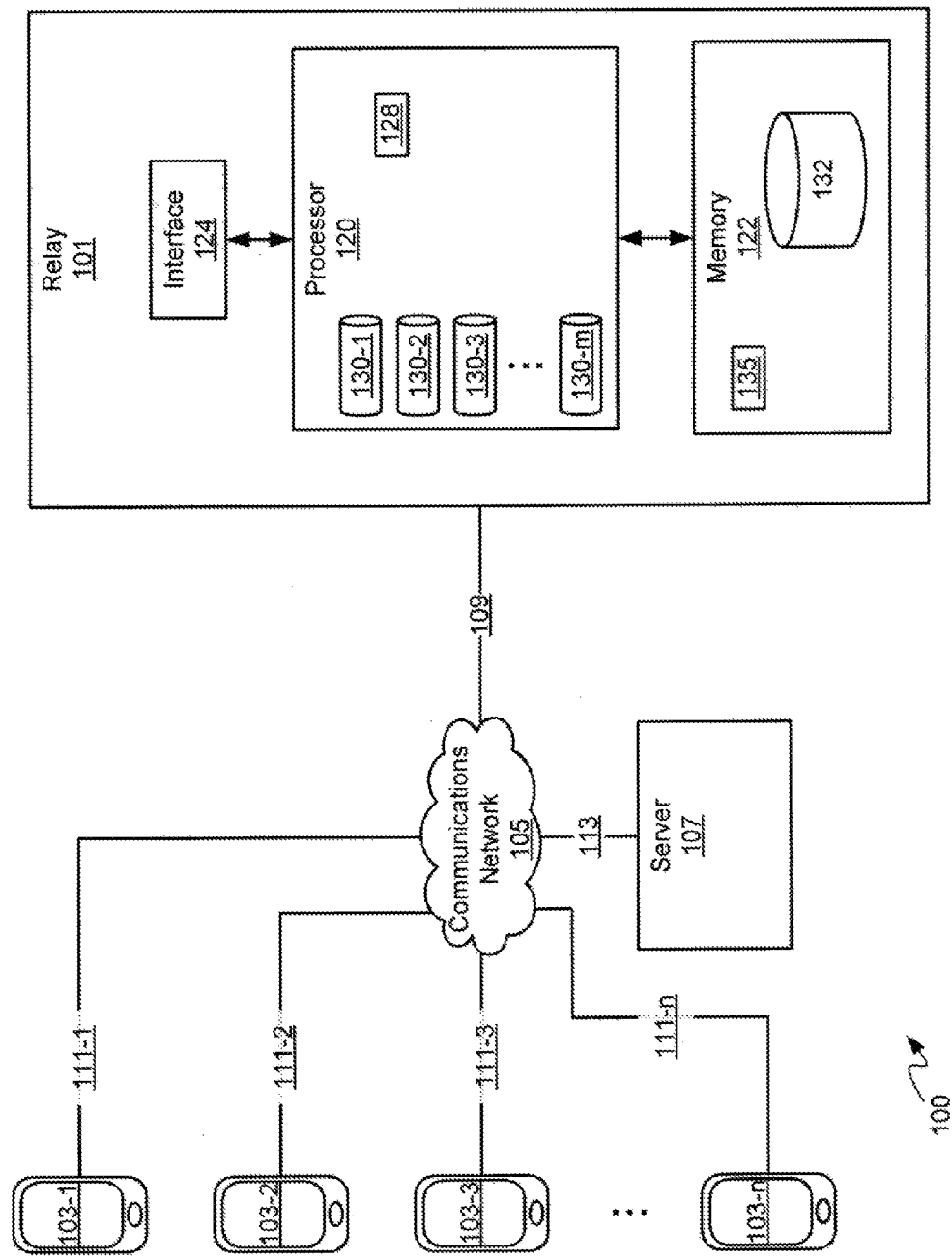
FIG. 1 depicts system with efficient service change handling, according to non-limiting implementations.

An aspect of the specification provides a relay device comprising: a processor; a memory; a communication interface; and a plurality of connection objects, each of the plurality of connection objects comprising a respective queue of messages, each of the messages for relay in association with respective devices via the communication interface, the processor enabled to: maintain, in the memory, a cache of associations between respective identifiers of the connection objects and identifiers associated with respective messages respectively queued therein; receive an indication of a service change to a given device; determine, from the cache, a subset of the plurality of connection objects comprising given messages associated with the given device; and communicate only with the subset to apply an action associated with the service change to the given messages, while ignoring the remaining connection objects in association with the action.

The processor can be further enabled to: when the subset comprises a null set and none of the messages are associated with the given device, take no action such that no communication occurs between the processor and the plurality of connection objects regarding the service change.

The indication of the service change can comprise an indication of termination of a service associated with the given messages, and wherein the processor can be further enabled to communicate only with the subset to apply the action associated with the service change to the given messages by transmitting a message to the subset to delete the given messages.

The action can comprise deleting the given messages from their respective queues.

The processor can be further enabled to: when a new message is received for relay, queue the new message in a given connection object; and, store a respective identifier associated with the message in the cache in association with the given connection object.

The identifiers associated with the respective messages can comprise respective device identifiers of respective devices, and wherein the processor can be further enabled to determine, from the cache, a subset of the plurality of connection objects comprising given messages associated with the given device based on a given device identifier of the given device received with the indication of the service change.

The identifiers associated with the respective messages can comprise respective message identifiers.

The processor can be further enabled to delete the identifiers associated with respective messages from the cache once the action associated with service change is applied.

The processor can be further enabled to communicate with the plurality of connection objects via control messages.

The relay device can further comprise one or more of a router and a switch.

Another aspect of the specification provides a method comprising: maintaining, in a memory of a relay device, a cache of associations between respective identifiers of connection objects and identifiers associated with respective messages respectively queued therein, the relay device comprising a plurality of connection objects, each of the plurality of connection ejects comprising a respective queue of messages, each of the messages for relay in association with respective devices via a communication interface of the relay device; receiving, at a processor of the relay device, an indication of a service change to a given device; determining, from the cache, a subset of the plurality of connection objects comprising given messages associated with the given device; and, the processor communicating only with the subset to apply an action associated with the service change to the given messages, while ignoring the remaining connection objects in association with the action.

The method can further comprise, when the subset comprises a null set and none of the messages are associated with the given device, taking no action at the processor, such that no communication occurs between the processor and the plurality of connection objects regarding the service change.

The indication of the service change can comprise an indication of termination of a service associated with the given messages, and wherein the method can further comprise: the processor communicating only with the subset to apply the action associated with the service change to the given messages by transmitting a message to the subset to delete the given messages.

The action can comprise deleting the given messages from their respective queues.

The method can further comprise: when a new message is received for relay, queuing the new message in a given connection object; and, storing a respective identifier associated with the message in the cache in association with the given connection object.

The identifiers associated with the respective messages can comprise respective device identifiers of respective devices, and wherein the method can further comprise determining, from the cache, a subset of the plurality of connection objects comprising given messages associated with the given device based on a given device identifier of the given device received with the indication of the service change.

The identifiers associated with the respective messages can comprise respective message identifiers.

The method can further comprise deleting the identifiers associated with respective messages from the cache once the action associated with service change is applied.

The method can further comprise communicating with the plurality of connection objects via control messages.

Yet a further aspect of the specification provides a computer program product, comprising a computer usable medium having a computer readable program code adapted to be executed to implement a method comprising: maintaining, in a memory of a relay device, a cache of associations between respective identifiers of connection objects and identifiers associated with respective messages respectively queued therein, the relay device comprising a plurality of connection objects, each of the plurality of connection objects comprising a respective queue of messages, each of the messages for relay in association with respective devices via a communication interface of the relay device; receiving, at a processor of the relay device, an indication of a service change to a given device; determining, from the cache, a subset of the plurality of connection objects comprising given messages associated with the given device; and, the processor communicating only with the subset to apply an action associated with the service change to the given messages, while ignoring the remaining connection objects in association with the action. The computer program product can comprise a non-transitory computer program product.

FIG. 1 depicts a system 100 comprising a relay 101 for relaying messages between at least devices 103-1, 103-2, 103-3 ... 103-$n$ via a communication network 105, according to non-limiting implementations. Devices 103-1, 103-2, 103-3 ... 103-$n$ will interchangeably be referred to hereafter collectively as devices 103 and generically as a device 103. Communications network 105 will be interchangeably referred to hereafter as network 105. System 100 further comprises a server 107 for generating service change notices, as described in further detail below. It is yet further appreciated that relay 101 is in communication with network 105 via one or more links 109, devices 193 are in communication with network 105 via respective links 1111-1, 111-2, 111-3, 111-$n$, and server 107 is in communication with network 105 via link 113. Links 111-1, 111-2, 111-3 ... 111-$n$ will interchangeably be referred to hereafter collectively as links 111 and generically as a link 111.

It is further appreciated that system 100 can comprise any suitable number of devices 103, including hundreds to millions of devices. For example, devices 103 can comprise handheld devices that are associated with accounts managed by an entity that in turn operates server 107 to manage service changes associated with devices. For example, each user of devices 103 can subscribe to services provided by the entity associated with server 107. As such, the entity can comprise a carrier operating at least a portion of network 105, and server 107 can be enabled to generate service notification changes associated with changes in service for a given device 103. As carriers are generally enabled to provide services to hundreds of thousands and even millions of subscribers, the number of devices 103 in system 100 can be commensurate with a number of devices operated by a carrier.

It is further appreciated that relay 101 is generally enabled to relay messages in association with respective devices 103, including but not limited to: relaying messages between devices 103, relaying messages to devices 103 and relaying messages from devices 103. It is yet further appreciated that messages can be received from devices other than devices 103 and messages can be transmitted to devices other than devices 103. For example, at least another portion of network 105 can include networks operated by entities/carriers other than an entity/carrier associated with server 107 and/or devices 103, and messages can be exchanged between devices 103 and devices associated with these other entities/carriers. Alternatively, network 105 can be in communication with another network operated by another carrier, with other devices connected thereto.

Relay 101 generally comprises a processor 120 interconnected with a memory 122 and a communications interface 124. Processor 120 is generally enabled to operate a relay manager 128 for managing at least a plurality of connection objects 130-1, 130-2, 130-3 ... 130-$m$. Connection objects 130-1, 130-2, 130-3 ... 130-$m$ will interchangeably be referred to hereafter collectively as connection objects 130 and generically as a connection object 130. Furthermore memory 122 stores a cache 132 for storing associations between one or more of devices 103, messages associated with devices 103 and connection objects 130.

It is yet further appreciated that processor 120 provides relay manager 128 and connection objects 130 by processing an application 135 stored at memory 122; for example, application 135 can comprise an application for relaying messages and managing relaying of messages.

Figure 2:
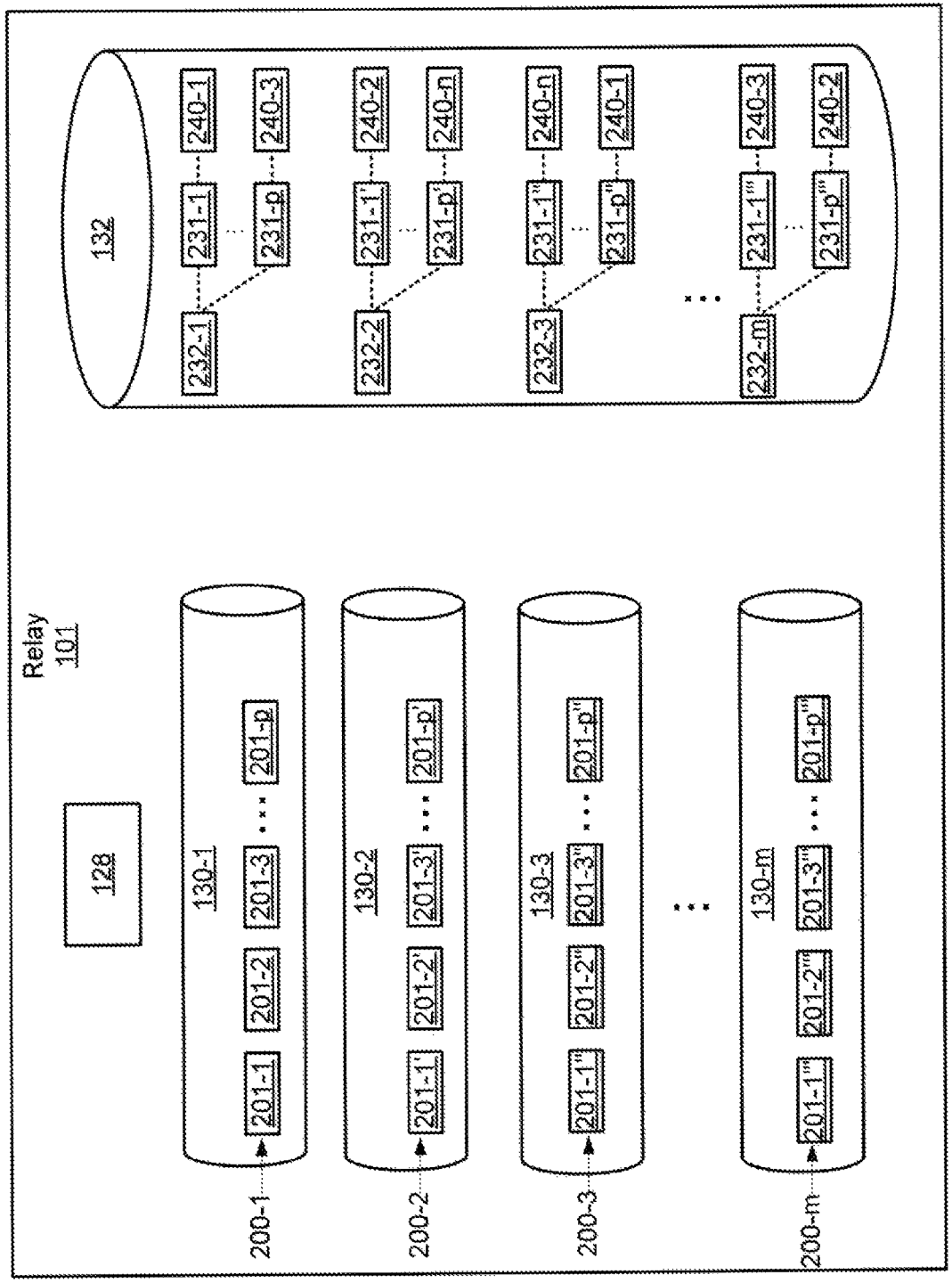
FIG. 2 depicts a schematic diagram of a relay of the system of FIG. 1 showing elements related to relay processes, according to non-limiting implementations.

Attention is next directed to FIG. 2 which depicts a subset of elements of relay 101, but it is appreciated that all elements of relay 101 are nonetheless present. For example, while processor 120 is not depicted at relay 101, it is nonetheless appreciated that processor 120 is present and further processing application 135 to operate relay manager 128 and connection objects 130. Put another way, FIG. 2 provides a schematic diagram of relay 101 showing elements related to relay processes: relay manager 128, connection objects 130 and cache 132.

In any event, from FIG. 2 it is appreciated that each of the plurality of connection objects 130 comprises a respective queue 200-1, 200-2, 200-3 ... 200-$m$ of messages. Queues 200-1, 200-2, 200-3 ... 200-$m$ will interchangeably be referred to hereafter collectively as queues 200 and generically as a queue 200. For example, connection object 130-1 comprises a queue 200-1 of messages 201-1, 201-2, 201-3 ... 201-$p$, connection object 130-2 comprises a queue 200-2 of messages 201-1', 201-2', 201-3' ... 201-$p$', connection object 130-3 comprises a queue 200-3 of messages 201-1", 201-2", 201-3", ... 201-$p$", and connection object 130-$m$ comprises a queue 200-$m$ of messages 201-1''', 201-2''', 201-3''' ... 201-$p$'''. Messages 201-1, 201-2, 201-3 ... 201-$p$, 201-1', 201-2', 201-3' ... 201-$p$', 201-1", 201-2", 201-3" ... 201-$p$", messages 201-1''', 201-2''', 201-3''' ... 201-$p$''' will interchangeably be referred to hereafter collectively as messages 201 and generically as a message 201.

In any event, it is appreciated that each of messages 201 is to be relayed to one or more of respective devices 103 and/or each of messages 201 is being relayed from a respective device 103. For example, a subset of messages can be received from devices 103 for relay to other devices 103 and/or for relay to devices in other carrier networks; a further subset of messages can be received from devices in other carrier networks for relay to devices 103 and/or for relay to devices in other carrier networks. Further, while each connection object 130 comprises a queue of messages, messages 201 are received and transmitted via communication interface 124.

As will be described below, relay manager 128 is generally enabled to manage which messages 201 are in each queue 200, and further to enforce service change notifications.

It is yet further appreciated that cache 132 comprises associations between respective identifiers 231-1 . . . 231-$p$, 231-1' . . . 231-$p$', 231-1'' . . . 231-$p$'', 231-1''' . . . 231-$p$''' of messages 201 and identifiers 232-1, 232-2, 232-3 . . . 232-$m$ of respective connection objects 130 in which a respective message 201 is queued. For example, identifier 231-1 comprises an identifier of message 201-1, identifier 231-$p$ comprises an identifier of message 201-$p$, etc. Associations are indicated in FIG. 2 via stippled lines. Identifiers 232-1, 232-2, 232-3 . . . 232-$m$ will be interchangeably referred to hereafter collectively as identifiers 232 and generically as an identifier 232.

Further, identifier 232-1 comprises an identifier of connection object 130-1, identifier 232-2 comprises an identifier of connection object 130-2, etc. Identifiers 232-1, 232-2, 232-3 . . . 232-$m$ will be interchangeably referred to hereafter collectively as identifiers 232 and generically as an identifier 232.

Further, each message identifier 231 can be further associated with an identifiers 240-1, 240-2, 240-3 . . . 240-$n$ of a respective device 103 with which a message identified by an identifier 231 is associated. For example, identifiers 240-1 identifies device 103-1, identifier 240-2 identifies device 103-2, identifier 240-3 identifies device 103-3 and identifier 240-$n$ identifies device 103-$n$. Identifiers 2404, 240-2, 240-3 . . . 240-$n$ will be interchangeably referred to hereafter collectively as identifiers 240 and generically as an identifier 240.

Hence, for example, it is appreciated that message 201-1, identified by identifier 231-1 and queued for relay at connection object 130-1, is associated with device 103-1 identified by identifier 240-1 in cache 132 similarly, message 201-1'', identified by identifier 231-1'' and queued for relay at connection object 130-3, is associated with device 103-$n$ identified by identifier 240-$n$, in cache 132, etc. Hence, each message 201 that is queued for relay to one of device 103 or received from one of devices 103 for relay to another device 103 and/or a device in another network is identified in cache 132 and stored in association with an identifier 232 of the connection object 130 in which the message 201 is queued.

Each of identifiers 231, 232, 240 can comprise any suitable respective format. For example each identifier 231 can comprise a respective alphanumeric message ID (identifier) received with each message 201. Similarly, each identifier 232 can comprise a respective alphanumeric connection object identifier assigned to each respective connection object 130, for example by relay manager 128 according to any suitable numbering scheme. Similarly, each identifier 240 can comprise a respective alphanumeric device identifier received with each message 20$h$ for example one or more of Personal Identification Number (PIN), a media access control (MAC) address, a network address, an internet protocol (IP) address, and the like.

Figure 3:
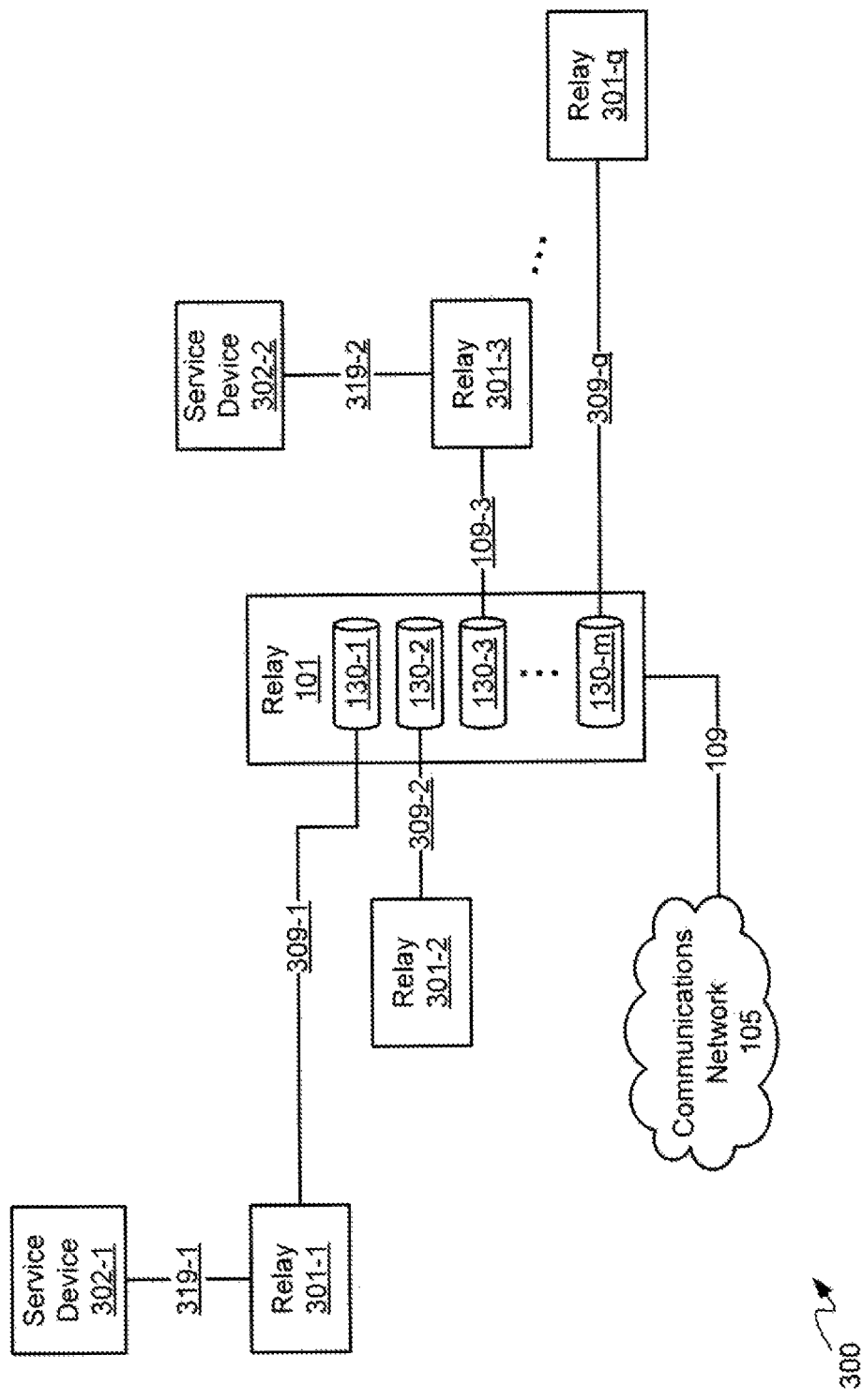
FIG. 3 depicts a system with efficient service change handling, according to non-limiting implementations.

Attention is next directed to FIG. 3 which depicts a system 300 comprising relay 101 and further relays 301-1, 301-2, 301-3 . . . 301-$q$, referred to interchangeably hereafter collectively as relays 301 and generically as a relay 301. It, is appreciated that system 300 can be a subset of system 100. It is further appreciated that while FIG. 3 depicts a subset of elements of relay 101, all elements of relay 101 are nonetheless present. For example, while processor 120 is not depicted at relay 101, it is nonetheless appreciated that processor 120 is present and further processing application 135 to operate relay manager 128 and connection objects 130.

For example, each of relays 101, 301 can comprise a network component of network 105 and/or a component of another communications network connected to network 105. In any event, it is appreciated that relays 301 are substantially similar to relay 101 and comprise respective processors, memories and interfaces similar to processor 120, memory 122 and interface 124 respectively. Further, each relay 301 comprises a respective relay manager and respective connection objects.

Relays 101, 301 are interconnected via links 309-1, 309-2, 309-3 . . . 309-$q$.

In any event, it is appreciated that one, or more of relays 101, 301 receive messages 201, for example from other network elements of network 105 and the like, and/or from each other, and relay messages 201 appropriately. Indeed, each message 201 can be further associated with a respective service, and relays 101, 301 can be enabled to relay a given message 201 to a respective service device 302-1, 302-2, referred to hereafter collectively as service devices 302 and generically as a service device 302. Service device 302-1 is in communication with relay 301-1 via a link 319-1, and service device 302-2 is in communication with relay 301-3 via a link 319-2. Links 319-1, 319-2 are referred to collectively hereafter as links 319 and generically as a link 319.

While FIG. 3 depicts only relay 101 in communication with network 105 via link 109, any of relays 301 can also be in communication with network 105 via a respective link (not depicted). It is further appreciated that one or more of relays 101, 301 can be in communication with any other communication network. Hence, relays 101, 301 can link together communication networks, relaying messages 201 there between and/or relay messages 201 between devices 103 and service devices 302. In yet further implementations, relays 101, 301 can be components of network 105.

In any event, some of messages 201 can comprise messages associated with specific given services associated with one or more of service devices 302. For example, some of messages 201 can comprise email messages, and service device 302-1 can comprise an email server for handling email messages on behalf of at least a portion of devices 103; similarly, further messages 201 can comprise text messages and service device 302-2 can comprise a text message server for handling text messages on behalf of at least a portion of devices 103.

Hence, a message 201 can be received at relay 101 from network 105 via link 109 for a specific service, for example a service provided by service device 302-1; relay 1 can relay the message 201 to relay 301-1, which in turn relays the message to service device 302-1, which in turn can direct the message to a destination device, relaying the message back through system 300 to network 105 and/or another network, and to the destination device In any event, each connection object 130 of relay 101 is enabled to transmit message 201 in their respective queues 200 to a given relay 301. For example, connection object 130-1 is associated with relay 301-1, and messages 201 queued at connection object 130-1 are relayed to relay 301-1 as each message 201 reaches the front of queue 200-1.

Hence, while not depicted, relay 101 (as well as relays 301) can comprise a routing table, and the like (e.g. stored in memory 122), to determine how to handle a given message 201, which can be implemented by relay manager 128. Hence relay manager 128 can cause a given message 201 to be queued in a given connection object 130 based on a type of service associated with a given message 201.

It is yet further appreciated that messages 201 can be queued in a given connection object 130 based on a respective device 103 associated with a given message 201. For example, a given relay 101, 301 can be dedicated to routing messages to and/or from subset of devices 103. Hence, respective messages 201 can be queued in a connection object 130 associated with a relay associated with the respective origin or destination of the respective messages 201.

For example, processor 120 can determine that a given message 201 is associated with a service 302-1 and hence the given message 201 is to be relayed to relay 301-1, for further relay to service device 302-1 (and ultimately for relay to a final destination, such as a given device 103 or the like). As such processor places the given message 201 in queue 200-1 of connection object 130-1, as depicted in FIG. 2. Similarly, each message 201 is placed in a queue based on which relay 301 and/or service device 302 a given message 301 is to be relayed to.

While connection objects 130 are depicted in one-to-one relationship with relays 301, in other implementations, more than once connection object 130 can be associated with a given relay 301.

Further, not all relays 101, 301 need be connected to all other relays 101, 301. For example, relay 301-$q$ is connected to service device 302-2 via relays 101, 302-2. Hence, it is yet further appreciated that, in some implementations, messages and/or data in system 300 can be propagated by hopping between relays 101, 301. However, in other implementations, all relays 101, 301 in system 300 are in communication with all other relays 101, 301 in system 300, hence messages and/or data can be propagated between relays in a single hop respective to each relay 101, 301. It is yet further appreciated that system 300 can comprise any given number of relays, for example in regional, national, and worldwide networks; indeed, when system 300 comprises a worldwide network of relays, a number of relays 101, 301 can be large (e.g. thousands, hundreds of thousands and the like).

However, a number of connection objects 130 at each relay 101, 301 can be less than a number of relays 101, 301, but can also be greater than or equal to a number of relays 101, 301 connected to a respective relays 101, 301, as more than one connection object 130 can be associated with a given connected relay 101, 301 in order to handle larger volumes of messages 201 exchanged with the given connected relay 101, 301.

It is yet further appreciated that a given message 201 can be relayed between a plurality of relays 101, 301 and a plurality of service devices 302 before teaching a final destination. As such the routing of messages 201 at each relay 101, 301 can be determined from the aforementioned routing tables and the like.

In some implementations, one or more of relays 101, 301 can comprise one or more of a router and a switch.

In any event, returning to FIG. 1, components of system 100 will be described hereafter.

Relay 101 can be any type of relay device and/or routing device that can be used to operate relay manager 128, connection objects 130 and maintain cache 132, as well as perform any other suitable functions for relaying messages 201. Relay 101 includes, but is not limited to, any suitable combination of communication devices, relay devices, routing devices, relay servers, routing servers and the like. Relay 101 can be based on any well-known relay and/or router environment including a module that houses one or more central processing units, volatile memory (e.g. random access memory), persistent memory (e.g. hard disk devices) and network interfaces to allow relay 101 to communicate over link 109.

Relay 101 can be any type of relay device and/or routing device and/or switching device that can be used to operate relay managers 128, and the like, and respective connection objects 130, and the like and maintain cache 132, as well as perform any other suitable functions for relaying respective messages. Relay 101 includes, but is not limited to, any suitable combination of communication devices, relay devices, routing devices, relay servers, routing servers, switches, switching devices and the like. Relays 101 can be based on any well-known relay and/or router environment including a module that houses one or more central processing units, volatile memory (e.g. random access memory), persistent memory (e.g. hard disk devices) and network interfaces to allow relay 101 to communicate over respective link 109 and the like. In some implementations, relay 101 can comprise one or more of a router and a switch.

For example, relay 101 can comprise a suitable relay device and/or routing device and/or switching device running a suitable operating system, relay 101 comprising one or more central processing units (including but not limited to processor 120) random access memory (including but not limited to memory 122, each of which can comprise any suitable combination of volatile and non-volatile memory). However, it is to be emphasized that a vast array of computing environments for relay 101 are contemplated. It is further more appreciated that relay 101 can comprise any suitable number of relay devices and/or routing devices and/or switching devices.

Each device 103 can be any type of electronic device that can be used in a self-contained manner. Each device 103 can include, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances and the like. Other suitable devices are within the scope of present implementations. Each device 103 can be based on any well-known computing environment including a module that houses one or more central processing units, volatile memory (e.g. random access memory), persistent memory (e.g. hard disk devices, flash memory devices) and network interfaces to allow devices 103 to communicate over links 111.

Further, each device 103 can be associated with an account for which a given service can, in turn, be associated. For example, a given device 103 can be enabled to interact with network 105 for text messaging, email messaging, internet browsing and the like, and a subscriber associated with each device 103 can pay the entity associated with server 107 for a given service.

Server 107 generally comprises a server enabled to generate device change notices, as described in further detail below. Server 107 can be based on any well-known server environment including a module that houses one of more central processing units, volatile memory (e.g. random access memory), persistent memory (e.g. hard disk devices) and network interfaces to allow server 107 to communicate over link 113. For example, server 107 can be a Sun Fire V480 running a UNIX operating system, from Sun Microsystems, Inc. of Palo Alto Calif., and having four central processing units each operating at about nine-hundred megahertz and having about sixteen gigabytes of random access memory which can comprise any suitable combination of volatile and non-volatile memory. However, it is to be emphasized that this particular server is merely exemplary, and a vast array of other types of computing environments for server 107 are contemplated. It is further more appreciated that server 107 can comprise any suitable number of servers that can perform different functionality of server implementations described herein.

Each of links 109, 111, 113, 309, 319 comprises any suitable link for respectively enabling relay 101, devices 103 and server 107 to communicate with network 105, and relays 101, 301 and service devices 302 to communicate with each other. Links 109, 111, 113, 309, 319 can hence each include any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links. WiFi links, WiMax links, packet based links, the Internet, analog networks, the PSTN (public switched telephone network), access points, and the like, and/or a combination.

It is appreciated that FIG. 1 further depicts a schematic diagram of relay 101 according to non-limiting implementations. It should be emphasized that the structure of relay 101 in FIG. 1 is purely an example, and contemplates a device that can be configured to relay messages 201. However, while FIG. 1 contemplates a device that enabled to relay messages, in other implementations, relay 101 can comprise a device enabled for both relaying messages and providing services: for example, relay 101 can both implement relay functionality and provide services similar to service devices 302.

Processor 120 (which can be implemented as a plurality of processors, including but not limited to one or more central processors (CPUs)) is configured to communicate with memory 122 comprising a non-volatile storage unit (e.g., Erasable Electronic Programmable Read Only Memory ("EEPROM"), Flash Memory) and a volatile storage unit (e.g. random access memory ("RAM")). Programming instructions that implement the functional teachings of relay 101 as described herein are typically maintained, persistently, in memory 122 and used by processor 120 which makes appropriate utilization of volatile storage during the execution of such programming instructions. Those skilled in the art recognize that memory 122 is an example of computer readable media that can store programming instructions executable on processor 120. Furthermore, memory 122 is also an example of a memory unit and/or memory module.

In particular, it is appreciated that memory 122 stores application 135 that, when processed by processor 120, enables processor 120 to: operate relay manager 128 for managing at least the plurality of connection objects 130, each of the plurality of connection objects 130 comprising a respective queue 200 of messages 201, each of the plurality of messages 201 for relay in association with respective devices 103 via communication interface 124; maintain, in memory 122, cache 132 of associations between respective identifiers 232 of connection objects 130 and identifiers 231, 240 associated with respective messages 201 respectively queued therein; receive an indication of a service change to a given device 103; determine, from cache 132, a subset of the plurality of connection objects 130 comprising given messages 201 associated with the given device 103; and, control relay manager 128 to communicate only with the subset to apply an action associated with the service change to the given messages 201, while ignoring the remaining connection objects 130.

It is yet further appreciated that application 135 is an example of programming instructions stored at memory 122.

Processor 120 also connects to interface 124, which can be implemented as one or more connectors and/or network adaptors and/or radios, configured to communicate with network 105 and/or relays 301 via link 109, 309. In general, it will be appreciated that interface 124 is configured to correspond with the network architecture that is used to implement link 109, 309, as described above. In other implementations a plurality of links 109, 309 with different protocols can be employed and thus interface 124 can comprise a plurality of interfaces to support each link 109, 309.

In any event, it is appreciated that any suitable combination of interfaces is within the scope of present implementations.

It is yet further appreciated that each of connection objects 130 receives and transmits messages via interface 124.

It is yet further appreciated that each connection object 130 can comprise and/or be connected to respective TCP/IP (Transmission Control Protocol/Internet Protocol) connections and/or ports at relay 101.

It is yet further appreciated that relay manager 128 and connection objects 130, can comprise one or more of hardware and software components. For example, logic for configuring relay manager 128 and connection objects 130 can be provided at respective applications 135 but each of connection objects 130 can further comprise at least a portion of one or more of processor 120 and interface 124.

Further, it should be understood that in general a wide variety of configurations for relay 101 are contemplated.

It is further appreciated that each of relays 301 can be similar to relay 101.

It is yet further appreciated that each of service devices 302 can comprise relay functionality as well as service functionality and can be similar, at least in part to relay 101 and/or server 107.

Figure 4:
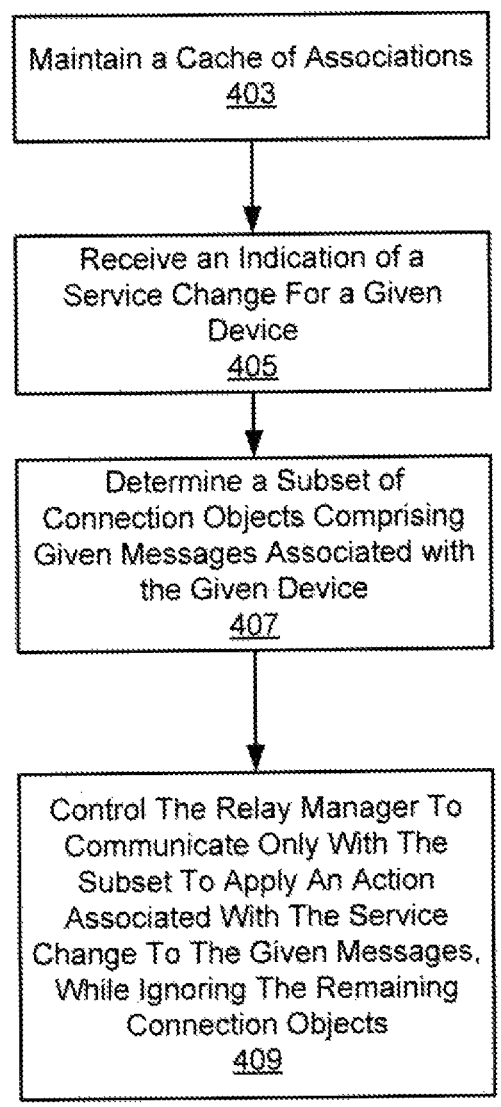
FIG. 4 depicts a flowchart of a method for efficient service change handling, according in non-limiting implementations.

Attention is now directed to FIG. 4 which depicts a flowchart of a method 400 for operating a relay efficiently, according to non-limiting implementations. In order to assist in the explanation of method 400, it will be assumed that method 400 is performed using system 100. Furthermore, the following discussion of method 400 will lead to a further understanding of system 100 and its various components. However, it is to be understood that system 100 and/or method 400 can be varied, and need not work exactly as discussed herein in conjunction with each other, and that such variations are within the scope of present implementations.

It is appreciated that, in some implementations, method 400 is implemented in system 100 by processor 120 of relay 101. Indeed, method 400 is one way in which relay 101 can be configured. It is to be emphasized, however, that method 400 need not be performed in the exact sequence as shown, unless otherwise indicated; and likewise various blocks may be performed in parallel rather than in sequence; hence the elements of method 400 are referred to herein as "blocks" rather than "steps". It is also to be understood, however, that method 400 can be implemented on variations of system 100 as well.

Figure 5:
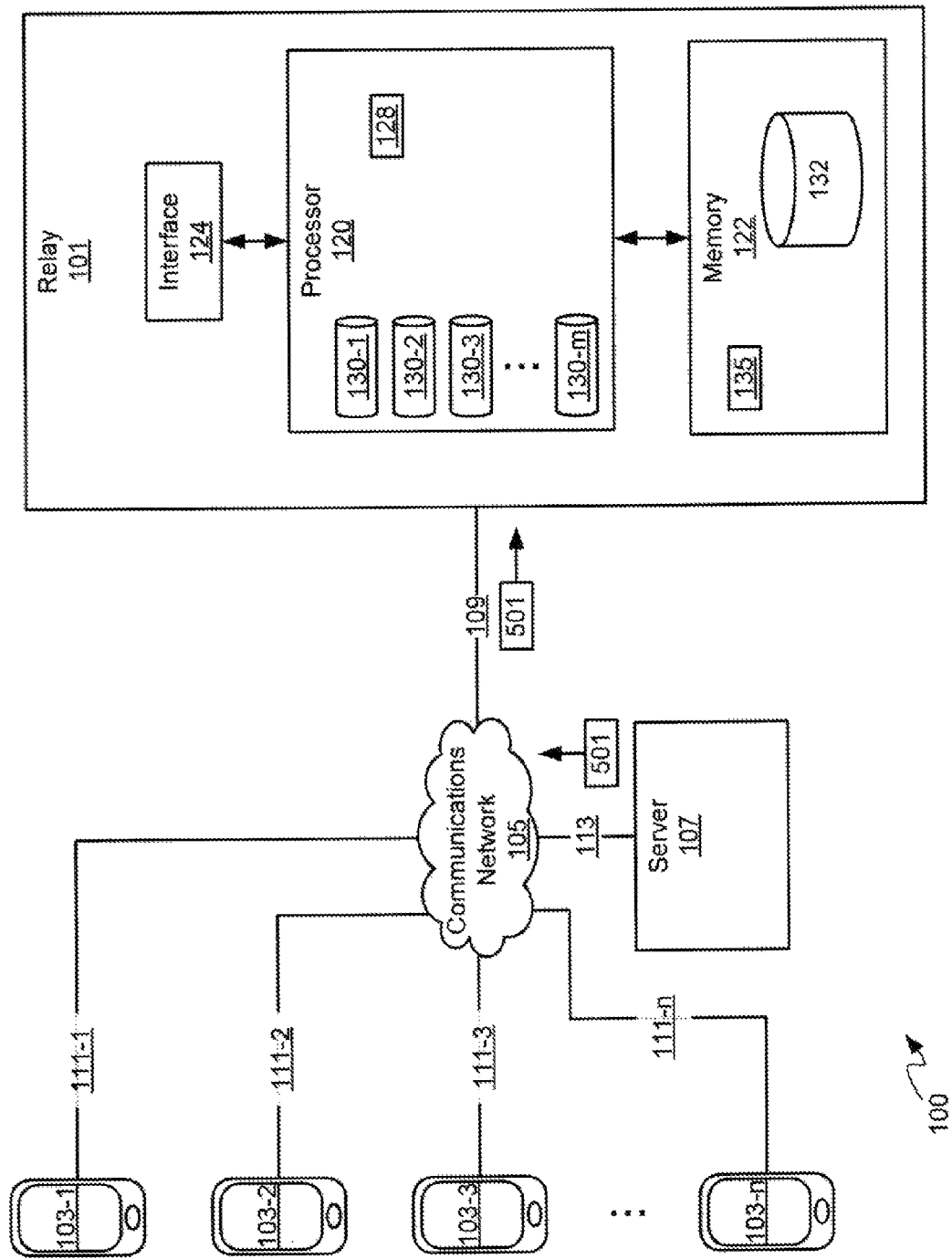
FIG. 5 depicts the system of FIG. 1 with an indication of a service change propagated therein, according to non-limiting implementations.
Figure 6:
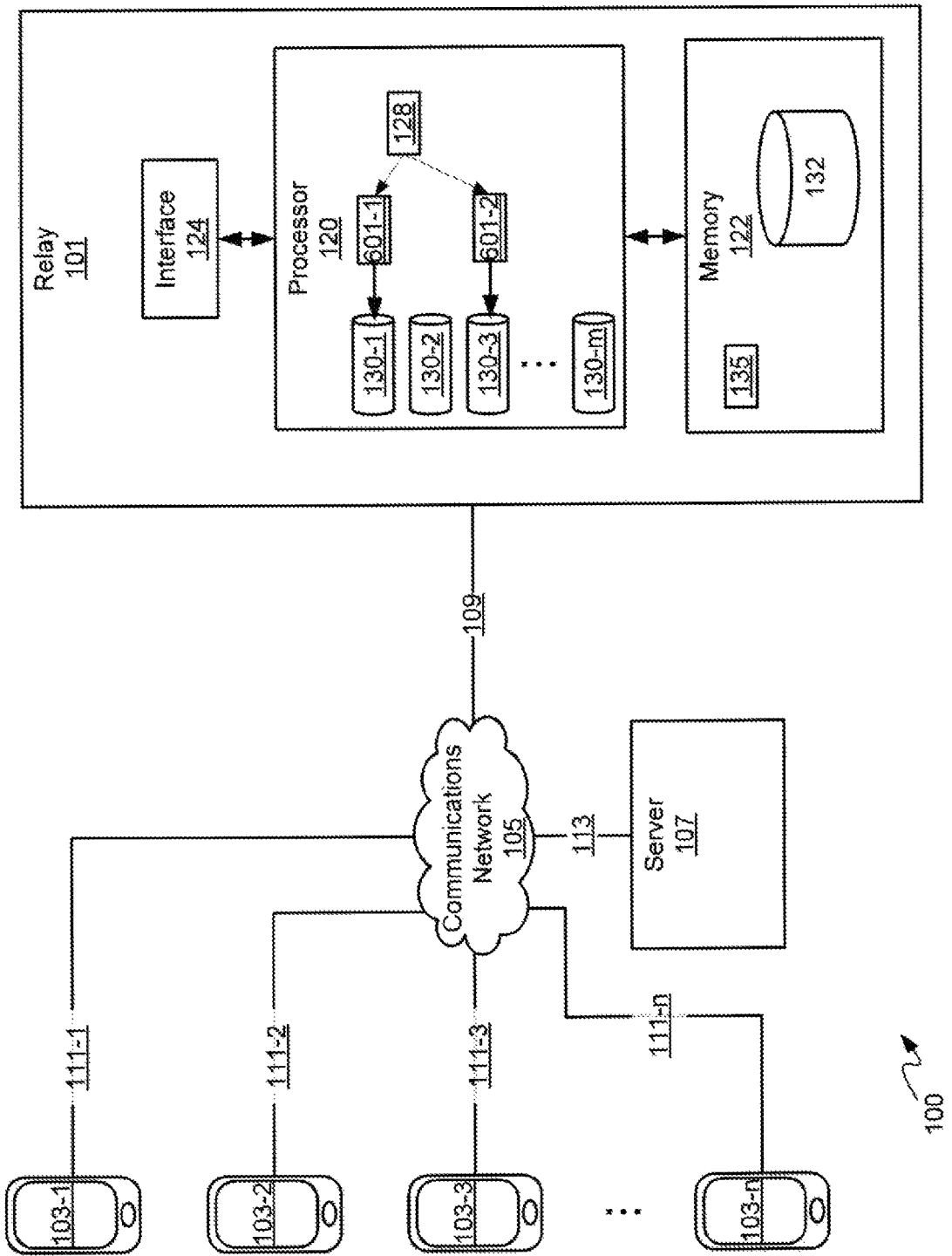
FIG. 6 depicts a relay manager communicating only with connection objects associated with the service change at a relay in the system of FIG. 1, according to non-limiting implementations.
Figure 7:
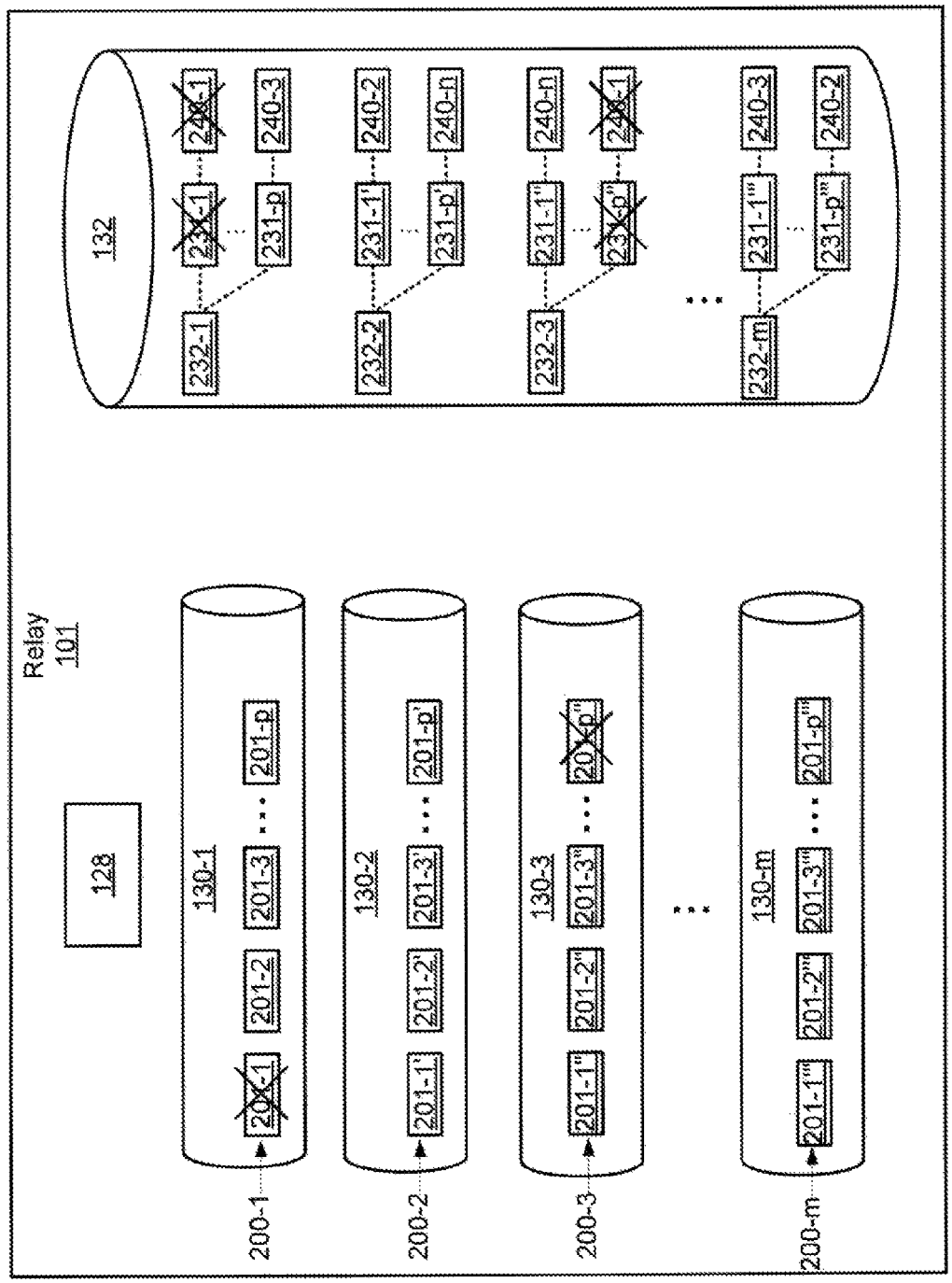
FIG. 7 depicts the relay of FIG. 2 showing messages associated with the service change being deleted at associated connection objects and a cache being correspondingly updated, according to non-limiting implementations.

Method 400 will also be discussed with reference to FIGS. 5 to 7: FIGS. 5 and 6 are each substantially similar to FIG. 1, with like elements having like numbers and FIG. 7 is substantially similar to FIG. 2, with like elements having like numbers.

It is further appreciated that processor 120 can communicate with connection objects via relay manager 128. For example, as previously described, each connection object 130 comprises a respective queue 200 of messages 201, each of messages 201 for relay in association with respective devices 103 via interface 124. For example, some messages 201 are for relay to respective devices 103, and other messages are received from respective devices 103 for relay to other devices, as described above. Relay manager 128 generally manages which messages 201 are in which queue 200 as described above.

However, in other implementations, functionality of relay manager 128 can be distributed among other elements of relay 101, and relay 101 need not comprise relay manager 128.

At block 403, processor 120 maintains, in memory 122, cache 132 of associations between respective identifiers 232 of connection objects 130 and identifiers 231 associated with respective messages 201 respectively queued therein, as described above. For example, when a new message 201 is received for relay 101, relay manager 128 queues new message 201 in a given connection object 130, for example based on one or more of which device 103 new message 201 is to be relayed to and a service associated with new message 201. Further, processor 120 can store a respective identifier 231 of new message 201 in cache 132 in association with the given connection object 130 in which the new message 201 is queued, along with an identifier of an associated device 103. Relay manager 128 can comprise the logic for determining which queue 200 to place a new message 201.

It is yet further appreciated that processor 120 is further enabled to maintain cache 132 by deleting an identifier 231 of a given message 201 and an identifier 240 of an associated device 103 once the given message 201 has been relayed. In other words, once a given message 201 has been transmitted by relay 101, the associated identifiers 231, 240 are cleared from cache 132.

In this manner, relay 101 is generally enabled to determine which connection objects 130 currently comprise messages 201 associated with a given device 103.

It is further appreciated that at least blocks 403 can be performed in parallel and/or in conjunction with any other block of method 400.

At block 405, relay 101 receives an indication of a service change to a given device 103. For example, attention is directed to FIG. 5, where server 107 transmits indication 501 to relay 101 via links 109, 113, and network 105. It is further appreciated that indication 501 can be initially transmitted to relay 101 via link 109, or another one of relays 301 via a respective link to network 105 and then propagated to relay 101 via links 309 and/or any intervening relays 301. In other words, each relay 301, 101 is further enabled to propagate indications of service changes to other relays in system 100 and/or system 300. It is yet further appreciated that relay 101 can itself be enabled to propagate indication 501 to other relays 301.

In any event, indication 501 comprises an indication of a service change associated with a given device 103. In a specific non-limiting example, generation of indication 501 will be discussed with regard to the given device 103 comprising device 103-1. For example, indication 501 can be generated when a subscriber associated with device 103-1 fails to pay a bill associated with one or more services for device 103-1. In other implementations, the subscriber associated with device 103-1 can cancel and/or change one or more services for device 103-1. In yet further implementations, an entity associated with server 107, for example a carrier providing coverage and/or services for device 103-1, can choose to cancel and/or suspend and/or change one or more services for device 103-1 due to problems with network 105 and the like, or for any other reason. Indeed, it is contemplated that indication 501 can be generated under many different conditions that would lead to a service change associated with device 103-1.

Indication 501 generally comprises an identifier of device 103-1, for example a PIN, a MAC address, a network address, and IP address and the like, as described above with reference to identifiers 240. Indeed, indication 501 can be similar and/or the same as a corresponding identifier 240 as described above. In the non-limiting example the given device 103 comprises device 103-1, hence the identifier transmitted in indication 501 can comprise indicator 240-1.

Indication 501 can further comprise an indication of a type of service change, for example an indication that a given service is to be cancelled and/or suspended; hence, in these implementations, indication 501 comprises an indication of termination of a service, whether permanent or temporary. In other implementations, indication 501 is inherently indicative of a type of service change, for example by virtue of a format of indication 501 and the like.

In any event, when relay 101 receives indication 501, at block 407, processor 120 determines, from cache 132, a subset of the plurality of connection objects 130 comprising given messages 201 associated with given device 103-1.

For example, it is appreciated from FIG. 2 that cache 132 stores identifier 240-1 identifying device 103-1; the data in indication 501 can hence be compared to data stored at cache 132 to determine which connection Objects 130 are presently queuing messages 201 associated with device 103-1. In the non-limiting example, it can be determined that connection objects 130-1, 130-3 are presently queuing messages 201 associated with device 103-1 as identifier 240-1 is stored in association with respective identifiers 231-1, 231-*p*" of messages 201-1, 201-*p*", and respective identifiers 232-1, 212-3 of connection objects 130-1, 130-3. Hence, in these implementations, the subset of the plurality of connection objects 130 comprises connection objects 130-1, 130-3.

Furthermore as cache 132 stores identifiers 240 of devices 103 associated with each message 201, processor 120 is further enabled to determine, from cache 132, the subset of the plurality of connection objects 130 comprising given messages 201 associated with the given device 103 based on a given device identifier of the given device received with indication 501 of the service change. Hence, the subset of the plurality of connection objects 130 comprising given messages 201 associated with the given device 103 can be determined with a single lookup in cache 132 using the given device identifier.

At block 409, processor 120 (and/or relay manager 128) communicates only with the subset to apply an action associated with the service change to the given messages 201, while ignoring the remaining connection objects 130 in association with the action. For example, attention is next directed to FIG. 6 where it is appreciated that relay manager 128 communicates with each connection object 130-1, 130-3 in the subset via control messages 601-1, 601-2. While current implementations are described with respect to relay manager 128 communicating with the plurality of connection objects 130 via control messages, relay manager 128 can be enabled to communicate with the plurality of connection objects 110 in any suitable manner, including signalling and the like Assuming that indication 501 is an indication of termination of service, control messages 601-1, 601-2 cause each respective connection object 130-1, 130-2 to delete respective messages 201-1, 201-*p*", as depicted in FIG. 7. Hence, respective messages 201-1, 201-*p*" are deleted from respective queues 200-1, 200-3.

As further depicted in FIG. 7, identifiers 231-1, 231-*p*", 240-1 associated with messages 201-1, 201-*p*" are deleted from cache 132 once an action associated with service change is applied. In other words, when messages 201-1, 201-*p*" are deleted from their respective queues 200-1, 200-3, their respective identifiers 231-1, 231-p'', 240-1 are also deleted from cache 132.

It is yet further appreciated that other connection objects 130-2, 130-m are ignored in association with the action and hence no message is transmitted to other connection objects 130-2, 130-m in association with receipt of indication 501. However, processor 120 can communicate with other connection objects 130-2, 130-m in association with other actions, including but not limited to actions not associated with the service change, relaying messages associated with devices 103 other than the given device 103-1.

Furthermore, in some implementations, the subset can comprise a null set. In other words, in some implementations, relay 101 comprises no messages 201 associated with indication 501 of service change and/or the associated given device 103-1. Hence, in these implementations, no action is taken such that no communication occurs between processor 120 and/or relay manager 128 and the plurality of connection objects 130 regarding the service change.

Persons skilled in the art will appreciate that there are yet more alternative implementations and modifications possible. For example service changes at relay 101 are not limited to termination of service. Indeed, in other implementations, the service change can comprise a change in priority of a service of given device 103-1, which is reflected in indication 501; and hence processor 120 (and/or relay manager 128) can communicate only with those connection objects 130 comprising given messages 201 associated with given device 103-1 to apply the change in priority to the given messages 201. For example, the given messages 201 can be moved to a front of a respective queue 200 for faster relay or moved to a rear of a respective queue 200 for slower relay.

In any event, whether the subset comprises one or more connection objects 130 or is null, communication occurs between processor 120 (and/or relay manager 128) and only those connection objects 130 associated with the service change. In this manner, service changes are handled more efficiently as communicating with all connection objects 130 would generally be a waste of processing resources at relay 101. Considering that method 400 can be implemented in each of relays 101, 301, implementation efficiency of service changes is improved across systems 100, 300.

Those skilled in the art will appreciate that in some implementations, the functionality of relays 101, 301 and server 107 can be implemented using pre-programmed hardware or firmware elements (e.g., application specific integrated circuits (ASICs), electrically erasable programmable read-only memories (EEPROMs), etc.), or other related components. In other implementations, the functionality of relays 101, 301 and server 107 can be achieved using a computing apparatus that has access to a code memory (not, shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk. USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever Persons skilled in the art will appreciate that there are yet more alternative implementations and modifications possible, and that the above examples are only illustrations of one or more implementations. The scope, therefore, is only to be limited by the claims appended hereto.

What is claimed is:

1. A relay device comprising:
   a processor;
   a memory;
   a communication interface; and
   a plurality of connection objects, each of the plurality of connection objects comprising a respective queue of messages, each of the messages for relay in association with respective mobile devices via the communication interface,
   the processor configured to:
      maintain, in the memory, a cache of associations data between respective identifiers of the connection objects and identifiers associated with respective messages respectively queued therein;
      receive, from a server configured to manage service changes for the mobile devices, an indication of a termination of service of a given mobile device;
      determine, from the cache, a subset of the plurality of connection objects comprising given messages associated with the given mobile device by comparing data in the indication with the associations data stored at the cache to determine which of the plurality of connection objects are presently queuing messages associated with the given mobile device; and,
      communicate only with the subset to delete the given messages from their respective queues, while ignoring the remaining connection objects in association with deleting the given messages, so that no communication occurs with the remaining connection objects in association with receipt of the indication.

2. The relay device of claim 1, wherein the processor is further configured to: when the subset comprises a null set and none of the messages are associated with the given mobile device, take no action such that no communication occurs between the processor and the plurality of connection objects regarding the termination of service.

3. The relay device of claim 1, wherein the processor is further configured to communicate only with the subset to delete the given messages by transmitting a message to the subset to delete the given messages, and no message is transmitted to the remaining connection objects.

4. The relay device of claim 1, wherein the processor is further configured to:
   when a new message is received for relay, queue the new message in a given connection object; and,
   store a respective identifier associated with the message in the cache in association with the given connection object.

5. The relay device of claim 1, wherein the identifiers associated with the respective messages comprise respective mobile device identifiers of respective mobile devices, and wherein the processor is further enabled to determine, from the cache, a subset of the plurality of connection objects comprising given messages associated with the given mobile device based on a given mobile device identifier of the given mobile device received with the indication of the termination of service.

6. The relay device of claim 1, wherein the identifiers associated with the respective messages comprise respective message identifiers.

7. The relay device of claim 1, wherein the processor is further configured to delete the identifiers associated with respective messages from the cache once the given messages are deleted.

8. The relay device of claim 1, wherein the processor is further configured to communicate with the plurality of connection objects via control messages.

9. The relay device of claim 1, further comprising one or more of a router and a switch.

10. A method comprising:
maintaining, in a memory of a relay device, a cache of associations data between respective identifiers of connection objects and identifiers associated with respective messages respectively queued therein, the relay device comprising a plurality of connection objects, each of the plurality of connection objects comprising a respective queue of messages, each of the messages for relay in association with respective mobile devices via a communication interface of the relay device;
receiving, from a server configured to manage service changes for the mobile devices, at a processor of the relay device, an indication of a termination of service of a given mobile device;
determining, from the cache, a subset of the plurality of connection objects comprising given messages associated with the given mobile device by comparing data in the indication with the associations data stored at the cache to determine which of the plurality of connection objects are presently queuing messages associated with the given mobile device; and,
the processor communicating only with the subset to delete the given messages, while ignoring the remaining connection objects in association with the deleting the given messages, so that no communication occurs with the remaining connection objects in association with receipt of the indication.

11. The method of claim 10, further comprising, when the subset comprises a null set and none of the messages are associated with the given mobile device, taking no action at the processor, such that no communication occurs between the processor and the plurality of connection objects regarding the termination of service.

12. The method of claim 10, further comprising: the processor communicating only with the subset to delete the given messages by transmitting a message to the subset to delete the given messages, and no message is transmitted to the remaining connection objects.

13. The method of claim 10, further comprising:
when a new message is received for relay, queuing the new message in a given connection object; and,
storing a respective identifier associated with the message in the cache in association with the given connection object.

14. The method of claim 10, wherein the identifiers associated with the respective messages comprise respective mobile device identifiers of respective mobile devices, and wherein the method further comprises determining, from the cache, a subset of the plurality of connection objects comprising given messages associated with the given mobile device based on a given mobile device identifier of the given mobile device received with the indication of the termination of service.

15. The method of claim 10, wherein the identifiers associated with the respective messages comprise respective message identifiers.

16. The method of claim 10, further comprising deleting the identifiers associated with respective messages from the cache once the given messages are deleted.

17. The method of claim 10, further comprising communicating with the plurality of connection objects via control messages.

18. A non-transitory computer program product, comprising a computer usable medium having a computer readable program code adapted to be executed to implement a method comprising:
maintaining, in a memory of a relay device, a cache of associations data between respective identifiers of connection objects and identifiers associated with respective messages respectively queued therein, the relay device comprising a plurality of connection objects, each of the plurality of connection objects comprising a respective queue of messages, each of the messages for relay in association with respective mobile devices via a communication interface of the relay device;
receiving, from a server configured to manage service changes for the mobile devices, at a processor of the relay device, an indication of a termination of service of a given mobile device;
determining, from the cache, a subset of the plurality of connection objects comprising given messages associated with the given mobile device by comoaring data in the indication with the associations data stored at the cache to determine which of the plurality of connection objects are presently queuing messages associated with the given mobile device; and,
the processor communicating only with the subset to delete the given messages, while ignoring the remaining connection objects in association with the deleting the given messages, so that no communication occurs with the remaining connection objects in association with receipt of the indication.

\* \* \* \* \*

UNITED STATES PATENT AND TRADEMARK OFFICE
CERTIFICATE OF CORRECTION

PATENT NO.         : 8,902,913 B2  
APPLICATION NO.    : 13/592776  
DATED              : December 2, 2014  
INVENTOR(S)        : Areg Poghosyan Page 1 of 1

It is certified that error appears in the above-identified patent and that said Letters Patent is hereby corrected as shown below:

On the Title page, item [57]:

Abstract: "there for" should be changed to -- therefor --  
Abstract: "enabled to maintain" should be changed to -- enabled to: maintain --

In the Specification:

Column 1, line 7, "effluent" should be changed to -- efficient --  
Column 2, line 35, "ejects" should be changed to -- objects --  
Column 3, line 44, "193" should be changed to -- 103 --  
Column 3, line 45, "respective links 1111-1" should be changed to -- respective links 111-1 --  
Column 5, line 24, "identifiers" should be changed to -- identifier --  
Column 5, line 29, "2404" should be changed to -- 240-1 --  
Column 5, line 35, "132 similarly" should be changed to -- 132; similarly --  
Column 5, line 53, "20h" should be changed to -- 201 --  
Column 5, line 60, "It, is" should be changed to -- It is --  
Column 6, line 47, "relay 1" should be changed to -- relay 101 --  
Column 7, line 47, "teaching" should be changed to -- reaching --  
Column 9, line 2, "further more" should be changed to -- furthermore --  
Column 12, line 29, "212-3" should be changed to -- 232-3 --  
Column 12, line 56, "110" should be changed to -- 130 --

Signed and Sealed this  
Twenty-first Day of April, 2015

Michelle K. Lee  
*Director of the United States Patent and Trademark Office*